Feb. 10, 1953          F. L. MALTBY          2,628,333

SAFETY MEANS FOR ELECTRICAL APPARATUS

Filed Oct. 1, 1947          2 SHEETS—SHEET 1

INVENTOR.
FREDERICK L. MALTBY

BY      E. C. Sanborn
ATTORNEY

Feb. 10, 1953 F. L. MALTBY 2,628,333
SAFETY MEANS FOR ELECTRICAL APPARATUS
Filed Oct. 1, 1947 2 SHEETS—SHEET 2

INVENTOR.
FREDERICK L. MALTBY

BY
E. C. Sanborn
ATTORNEY

Patented Feb. 10, 1953

2,628,333

UNITED STATES PATENT OFFICE 2,628,333

SAFETY MEANS FOR ELECTRICAL APPARATUS

Frederick L. Maltby, Naugatuck, Conn., assignor to The Bristol Company, Waterbury, Conn., a corporation of Connecticut Application October 1, 1947, Serial No. 777,206

8 Claims. (Cl. 318—29)

This invention relates to measuring and controlling instruments of the null-balance class, and more especially to instruments in which a balance condition, once disturbed, is automatically restored by an electrically operated servomotor. As the balancing function of such a servomotor is customarily initiated by a departure of an applied electromotive force from a zero value, and as the extent of such departure (at least in so far as the fundamental of the operating frequency is concerned) from said zero value is a criterion of the degree of unbalance to be compensated for, it follows that attainment of such a zero value, from whatever cause, will be interpreted by the motor as representing a balance condition, and the motor will be brought to rest. In self-balancing bridges and potentiometers it is now customary to actuate the balancing mechanism by means of a small alternating-current motor, which may expediently be of the two-phase type, with one phase winding continuously energized and the other subjected to an alternating electromotive force of the same frequency as that impressed upon said first-named winding, but having a magnitude and a phase-position dependent upon the extent and the sense of unbalance. The application of this principle in the laternating-current bridge circuit is exemplified in U. S. Letters Patent No. 1,586,233, granted to H. Anschutz Kaempfe, May 25, 1926; and one manner in which the principle may be applied in the balancing of a direct-current potentiometer is set forth in co-pending application Serial No. 521,236, filed by William H. Bussey, January 5, 1944, now Patent No. 2,444,726, issued July 6, 1948.

In the said Anschutz-Kaempfe patent, the unbalance potential of an alternating-current bridge is impressed upon the input circuit of an electronic amplifier, whose output, in turn, is applied to one phase winding of a two-phase motor, operating to re-balance the bridge. It will be apparent that should the electronic system or any of the circuit elements immediately associated therewith be subject to failure, the motor would be rendered inoperative and would remain at rest.

In said Bussey patent, the unbalance potential of a direct-current potentiometer is impressed upon a magnetic modulator, whereby to obtain an alternating electromotive force of intensity and phase position corresponding to the magnitude and sense of unbalance; and said electromotive force, in turn, is suitably amplified and applied to an alternating current motor adapted to operate balance-restoring instrumentalities. It will be obvious that, as in the previously-described embodiment of a self-balancing system, failure of any part of the circuit to which the unbalance electromotive force is applied will result in the motor becoming inoperative.

In the art as heretofore exemplified, and including the two above-described embodiments, an inert condition of the balancing motor may be normal, as representing a state of balance wherein the indicating, recording, or controlling members of the apparatus should remain at rest; but, on the other hand, such condition, if due to failure of any part of the circuit, will result in non-functioning of said members in response to actual variations of the measured magnitude, which in the case of solely measuring instruments may indefinitely go undetected as falsely indicating a steady state of the measured variable, and, in the case of controlling instruments, may, by inhibiting the proper regulatory function, result in serious damage to plant or product.

While the present art reveals attempts to meet conditions introduced by failure of self-balancing networks, these universally involve superposing upon the normal balancing action a permanent biasing influence, and generally involving in case of trouble, the excursion of the indicating member of the instrument to one limit of its range. The disadvantages of such systems are avoided by the present invention, in which, upon the occurrence of a fault, the indicating member retains the position it occupied when the fault occurred; and response is effected through independent means.

It is an object of the present invention to provide means readily associated with a self-balancing motor and its auxiliary circuits, whereby to discriminate between normal conditions in which the motor may remain at rest, and abnormal conditions due to failure of electron tubes or other circuit elements.

It is a further object to provide for self-balancing networks a "fail-safe" wherein normal performance of the system is unaffected by the continuous influence of the safety device.

It is a further object to provide means of the above nature which shall be adaptable to the actuation of an alarm or signal.

It is a further object to provide means of the above nature in which the desired result may be effected with a minimum of moving parts in the discriminatory apparatus.

It is a further object to provide means of the above nature, wherein a large proportion of the requisite elements are inherent in the circuits of the instrument.

In the present invention, it is proposed to pass through the amplifying system whose condition is to be maintained under surveillance an auxiliary current of such a nature that it has no tendency to operate the motor, but, by suitably responsive relay means, may, when interrupted through failure of said amplifier, be caused to provide a signal, or superimpose special control functions upon the normal operation of the instrument. For example, assuming that the servomotor is of the two-phase type, having one phase winding continuously energized from a 60-cycle source, and the other winding subject to energization through an amplifier and at the same frequency, to operate the motor in a direction dependent upon the phase relation between the respective alternating-current energizations, there may be impressed upon the input terminals of the amplifier an alternating electromotive force of, say, 120 cycles' frequency. This electromotive force, when amplified and applied to the motor winding will produce no continuous rotative effort, but may be utilized in a relay system in such a manner that, so long as the amplifier continues to function, said relay system will continue energized, without respect to whether or not the motor is running; and, upon failure of the amplifying system or of any of its component parts, the relay, will be de-energized, and will provide suitable response to the failure.

Figure 1:
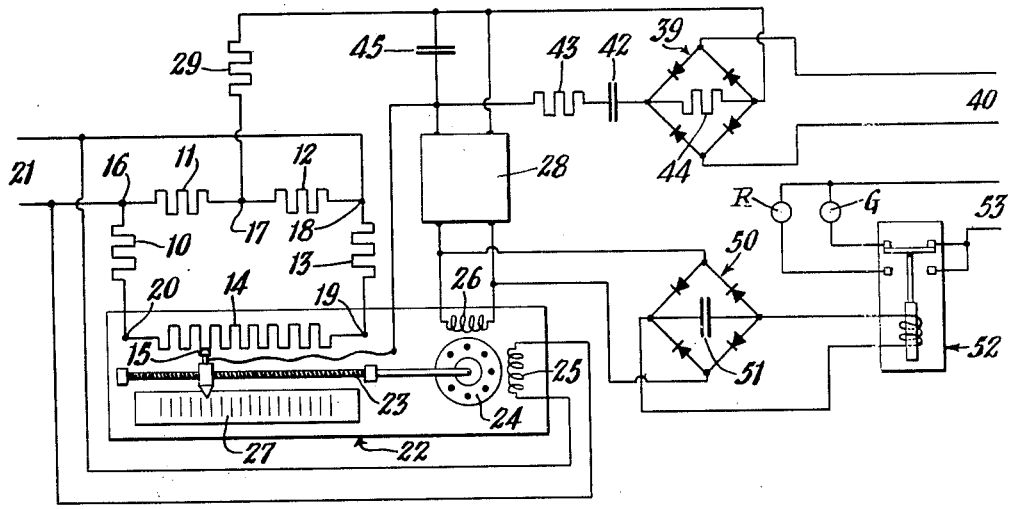
Fig. 1 is a diagrammatic representation of a manner in which the principles of the invention may be applied to a self-balancing alternating-current bridge system.

Referring now to Fig. 1 of the drawings:

A bridge network comprises four resistors 10, 10, 12 and 13, together with an extended slide-wire 14 having a cooperating translatable contact 15. The several points of interconnection of the bridge elements are designated as follows:

10 and 11—16
11 and 12—17
12 and 13—18
13 and 14—19
14 and 10—20

Between points 16 and 18 is impressed the alternating electromotive force derived from a suitable source 21. In case of unbalance of the network, as indicated by the presence of an alternating potential difference between the point 17 and the contact 15, the latter may be adjusted with respect to the slide-wire 14 until said potential is reduced to zero and a balance condition obtained.

The slide-wire 14 and its cooperating contact 15 are incorporated into a contact-adjusting mechanism 22 comprising a lead screw 23 rotatably journalled in said mechanism and adapted for operation by a reversible electric motor 24 to position said contact translatably along said slide-wire. The motor 24 is preferably of the two-phase type, having mutually displaced windings 25 and 26, of which the former is continuously energized from the source 21. An index or pointer carried by the contact 15 cooperates with a graduated scale 27 fixed in the mechanism 22 to provide an indication of the translated position of said contact with respect to the associated slide-wire, and thereby a measure of the magnitude of the condition responsible for unbalance of the bridge.

A transducer 28 having input and output terminals and adapted to function as a non-frequency-selective amplifier (and which will hereinafter be referred to as an amplifier) has its input terminals connected between the contact 15 and the junction point 17 in series with a resistor 29, whose purpose will presently be explained. The transducer 28 may be of any one of a variety of types well known in the art of industrial electronics, and of which one is shown in a simplified form in Fig. 2. A transformer 31, comprises a ferromagnetic core having thereon a primary winding adapted for energization from a suitable alternating-current source and a secondary winding having its middle point tapped and connected to ground. A rectifier tube 32 having a cathode and two anodes is arranged in circuit with said anodes connected to the terminals of the secondary winding of the transformer and said cathode grounded through a suitable capacitor 33, whereby, when said transformer primary is energized from said source, the alternating component of the tube output will be bypassed and a unidirectional potential maintained between said cathode and ground.

An amplifying triode 34 is arranged with its cathode grounded and providing one side of an input circuit, whose other side is connected to the control grid of said triode through a blocking capacitor 35. A grid resistor 36 is bridged between said control grid and cathode. An output transformer 37 is arranged with its primary winding connected between the cathode of the rectifier tube 32 and the anode of the triode 34. The rectifier tube 32 will provide a plate potential for the triode 34; and, according to the well-known principles of electronic circuits, an alternating potential impressed upon the input terminals will be amplified, and reproduced with appreciable power, in the secondary winding of said transformer. The extremities of said winding, constituting the output terminals of the amplifying unit, are connected to the winding 26 of the motor 24; and, as will hereinafter be pointed out, the design and proportioning of the several elements comprising, or immediately associated with, the amplifier may be made such as to impress upon said motor winding a potential having such magnitude, and bearing to the potential applied to the winding 25 such a phase relation, as to provide optimum operating conditions in the motor 24.

The combination as thus far set forth constitutes a conventional self-balancing alternating-current bridge, and, as such, provides a useful means of determining resistance, or of obtaining a measurement of any magnitude—e. g. temperature—whose variations can be continuously translated into corresponding variations of electrical resistance. The merit of the alternating-current bridge lies primarily in the fact that a balancing servomotor may be directly operated from the unbalance potential through the medium of an electronic amplifier; and while such a device is free from the short-comings and inherent faults of a galvanometer or of any detector having moving parts, it is subject to the weakness that electron tubes are of limited and somewhat unpredictable life. The same holds good, though to a lesser extent, of some forms of capacitors which are usually necessary in amplifier circuits. The outcome of these considerations is that, in so far as dependability is concerned, the amplifier constitutes a weak link in the system; and, should failure of any part of the amplifier result in its output voltage becoming zero, the motor 24 will remain at rest. Thus, as hereinbefore pointed out, there may be indicated a condition of balance, when such a condition does not exist, and the readings of the instrument may be falsified for an indefinite period, until the failure is detected.

Upon the input terminals of the amplifier 28 is impressed, in addition to the unbalanced potential derived from the bridge network at the points 15 and 17, an alternating potential having a frequency differing materially from that of the source 21 from which the bridge is energized. Such potential may be derived, for example, from a rectifier bridge 39 made up as shown and energized at one pair of opposite terminals from an alternating source 40, which may, or may not, be of the same frequency as that of the source 21. With such a rectifier combination, the potential appearing between the opposite terminals intermediate those to which the energizing potential is applied will contain two components, one unidirectional, and the other of double the frequency of the source 40. Said intermediate terminals of the rectifier-bridge 39 are connected to the input terminals of the amplifier 28 in series with a capacitor 42 which blocks the flow of unidirectional current and a resistor 43 which limits the flow of alternating current, from said rectifier bridge. A suitable resistor 44 connected across the output terminals of the rectifier-bridge provides a return path for the unidirectional component of current derived therefrom. The resistor 29 is made of such magnitude in relation to other elements of the circuit that changes normally taking place in the impedance of the bridge network will not appreciably affect the impedance across the input terminals of the amplifier unit. Thus, the magnitude of the "off-frequency" voltage applied to the amplifier will not be materially affected by the impedance of the bridge. A suitable capacitor 45 connected across the input terminals of the amplifier 28 provides in conjunction with the resistor 29 a phase-shifting network, whereby to obtain optimum phase relation between the voltages applied to the windings 25 and 26 of the alternating-current motor 24.

The potential impressed upon the input terminals of the amplifier 28 will contain two distinct components—one of the frequency of the source 21, and of magnitude and phase position dependent upon the unbalance conditions in the measuring bridge, and the other of the output frequency of the rectifier bridge 39 and unaffected by conditions in the measuring system. The motor 24, being of the two-phase induction type, and having one winding energized at the frequency of the source 21, will be operative only in response to a potential of the same frequency applied to the terminals of the other winding, so that the direction and force of rotation of the moving element of said motor will be responsive only to the component of that frequency existing in the output of the amplifier 28. Thus, while current having the frequency of the output of the rectifier bridge 39 may circulate in the winding 26, it will produce no continuous rotative effort upon the motor, and will have upon its operation no effect except a certain braking influence, which is generally not undesirable.

Connected to the output terminals of the amplifier 28, and in parallel with the winding 26 of the motor 24 is a full-wave rectifier 50, having its output terminals bridged by a capacitor 51 to bypass any alternating component which may exist in the output, and also connected to the actuating winding of a single-pole double-throw direct-curent relay 52. The contacts of said relay are so arranged as to energize from a source 53 (which may or may not be identical with any one of the hereinbefore mentioned power sources) one or other of two signal lights "G" (green) or "R" (red), according to whether the relay winding is energized or de-energized.

So long as the rectifier-bridge source 39 of "off-frequency" potential is energized, its output voltage will be impressed upon the amplifier 28, and will be applied to the rectifier 50 as well as to the winding 26 of the motor 24. As hereinbefore pointed out, this component does not directly affect the operation of the motor; but the rectifier, being independent of the applied frequency, will deliver a unidirectional output whether or not the bridge is balanced. When a state of balance exists the component having the basic frequency, of the source 21 will be absent from the amplifier input, and therefore from its output; but the component having the frequency of the source 39 will be unaffected, and, impressed upon the rectifier 50, will provide a unidirectional output which, by adjustment, is made sufficient to maintain the relay 52 energized. When the bridge is unbalanced, the amplifier output will include components of both frequencies involved in the system; and the unidirectional output of the rectifier 50 will be a magnitude representing the resultant of the two components, and greater than that due to either component alone. In the event of extreme unbalance of the bridge network, the component of the basic frequency may so overload the amplifier system as partly or wholly to obscure that from the source 39; but in such a case the rectifier output will still be sufficient to maintain the relay 52 energized and the light "G" illuminated, indicating a "safe" condition, without respect to whether or not the motor 24 is operating. The only circumstances under which the relay 52 can become deenergized and the light "R" illuminated are those corresponding to the disappearance of both the basic frequency and the "off-frequency" component from the amplifier output; and such a condition represents "trouble" of some nature—presumably failure of an element of the amplifier—but, in any event, a fault demanding immediate correction.

While the signal or alarm system has been set forth in its application to a servomotor-actuated self-balancing alternating-current system, in which the unbalance potential is inherently alternating, and of a frequency adapted to operation of the motor, it will be obvious that the same principle may be applied to self-balancing direct-current networks, including bridges and potentiometers, wherein the unidirectional unbalance potential is by some means converted into a corresponding alternating potential subsequently subjected to amplification for operating an alternating-current motor. This utilization of the invention involves only the production of an auxiliary alternating potential of a frequency to which the motor will not respond, and, as fully set forth in connection with the form of the invention shown in Fig. 1, the use of this potential after amplification, to actuate a relay and thus provide a check on the condition of the amplifier.

Figure 3:
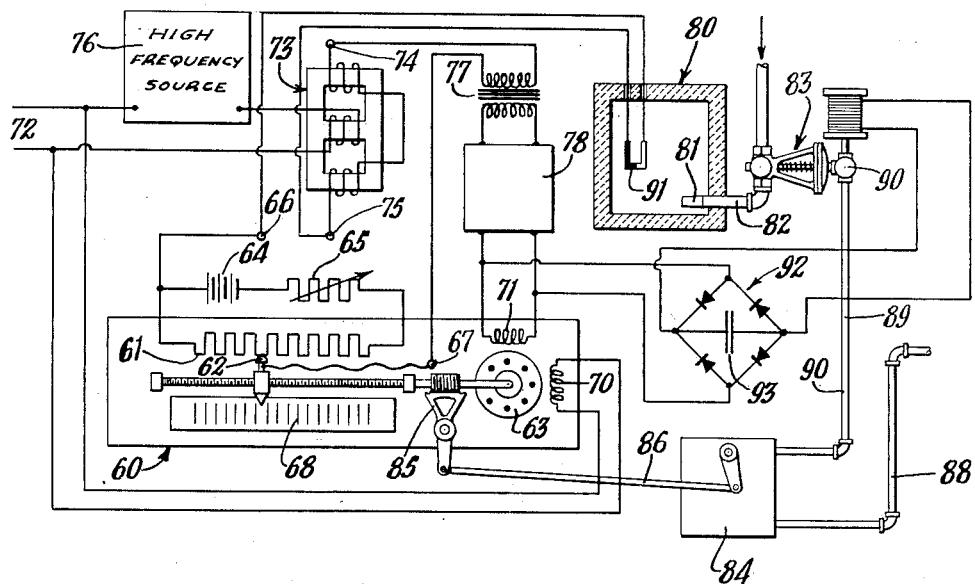
Fig. 3 is a representation of the invention as applied to a thermo-electrically controlled heating system embodying a self-balancing potentiometer.

The principle of the invention is especially adapted to use in conjunction with that form of automatically balanced direct-current network in which conversion of the unbalance potential to an alternating voltage suited to operation of a two-phase motor is effected by a method which inherently involves the use of an auxiliary current having a frequency other than that upon which the motor operates. Such a system is fully set forth and described in said Bussey Patent No. 2,444,726, and diagrammatically illustrated in Fig. 3, wherein the principle of the invention is shown in its adaptation to an elementary form of said system as applied to the measurement and automatic control of temperature in an enclosed space.

A potentiometer instrument 60 is comprised of a slide-wire resistor element 61 having a movable contact member 62 adapted to be positioned therealong by means of a reversible electric motor 63. The slide wire element 61 is adapted for energization from a battery or equivalent source of direct current 64 in series with an adjustable resistor 65, whereby the current in the slide wire may be set and maintained at a desired constant value to produce a predetermined constant fall of potential throughout the length of the slide wire. One end of the slide wire is connected to a terminal 66; and the movable contact member 62, by means of a suitable flexible lead, is connected to a terminal 67. An index or pointer carried by the contact member 62 cooperates with a stationary graduated scale 68 to exhibit the translated position of said contact member with respect to the slide-wire element 61, and thereby to provide a measure of such unidirectional potential as may be applied between the terminals 66 and 67.

The motor 63 is preferably of the two-phase type having a pair of mutually displaced windings 70 and 71, of which the former is continuously energized from a constant-frequency alternating-current source 72. A transformer member 73 is provided with a three-legged magnetic structure formed of high permeability ferromagnetic material having a non-linear characteristic, as for instance a member of that group of alloys of which those having the trade names of "Permalloy" and "Mumetal" are well known examples. Upon each of the three legs of the magnetic structure is wound a coil, two of said coils being substantially identical and differentially interconnected, the two ends of the winding so formed being connected to terminals 74 and 75, respectively. The interconnection of the coils comprising said winding is such that the voltages induced therein by alternating magnetic flux similarly passing through the core-legs upon which they are wound will be in opposition, so that any alternating secondary voltage appearing between the terminals 74 and 75 will be representative of the difference of simultaneous magnetic conditions in said legs.

The coil on the remaining leg of the magnetic structure constitutes a primary winding for the transformer member 73, and is adapted for energization from an alternating-current source, whereby to excite the magnetic circuit provided by said structure. Said coil is connected to the alternating-current source 72 in combination with a further source 76, preferably in the nature of an oscillator, whereby to superimpose upon the basic or fundamental frequency derived from the source 72 a component having a substantially higher frequency (for example, of the order of 25 times the basic frequency) and not necessarily bearing any specific or fixed ratio thereto.

Between the terminal 67 and the terminal 74 is connected the primary winding of a suitable transformer 77, the secondary winding of said transformer being connected to the input terminals of a non-linear transducer or amplifier 78, whose output terminals, in turn, are connected to the winding 71 of the motor 63. The amplifier 78 may be generally similar to the amplifier 28 shown in Fig. 1, but may have incorporated therein elements and characteristics whereby most expediently to utilize the output of the transformer 77 for controlling the operation of the motor 63, and at the same time not completely to eliminate from its output the component having a frequency corresponding to that of the source 76.

The apparatus as thus far set forth is equivalent to the corresponding device fully explained in said Bussey application; and for which, as such, no invention is herein claimed. According to the principles of said Bussey invention, the device constitutes a self-balancing potentiometer; and if a unidirectional electromotive force within the range of the potential drop across the slide-wire 61 be impressed between the terminals 66 and 67, there will appear in the output of the transformer 77 an alternating component which, when modulated by a suitable non-linear transducer will produce at the output terminals thereof an alternating potential of the frequency of the source 72, and dependent in intensity and phase position upon the sense and magnitude of the difference between said electromotive force and the potential between the contact member 62 and the extremity of the slide-wire 61 which is connected to the terminal 66. Said alternating component, impressed upon the winding 71 of the motor 63 will cause said motor to operate in a direction and with an intensity corresponding to said difference between unidirectional electromotive forces; and thus the motor may be utilized to restore a balance between the same, the pointer carried by the contact 62 providing on the scale 68 a measure of the deflected position of said contact, and hence of the applied electromotive force.

For the purpose of illustrating the application of the invention to an automatic control system, the potentiometric measuring apparatus is shown in i's adaptation to the regulation of temperature in an oven, furnace, or equivalent enclosed space, by varying the rate of admission of a heating agent thereto, while the principles of the invention are coordinated therewith in such a manner that in the event of failure of the amplifier or of any of i's component elements, the supply of said heating agent will be automatically discontinued. A furnace or oven 80 is adapted to be heated by fluid fuel admitted to a burner 81 within said furnace or oven through a conduit 82 having therein a pneumatically actuated regulating valve 83 adapted to be opened by the application of air pressure to its operating element and to be tightly closed when said pressure is removed. A pneumatic regulator 84, which may be of the general type fully set forth and disclosed in U. S. Letters Patent No. 1,880,247, granted November 4, 1932 to A. R. Mabey et al. is mechanically coupled to the balancing mechanism operated by the motor 63, as, for example, by means of a worm-gear sector 85 and a link 86, so that the position of the controlling instrumentalities in said regulator will be directly related to the position of the movable contact 62. Compressed air from a suitable source is admitted to the regulator 84 through a conduit 88. The outlet of the regulator 84 is connected to the pneumatic motor element of the valve 83 by means of a conduit 89 having therein a direct-current solenoid-actuated three-way valve 90 adapted when electrically energized to place the motor element of the valve 83 in communication with the conduit 89, and when de-energized to interrupt said communication and vent said motor element to the atmosphere. Suitably positioned within the furnace or oven 80 is a thermocouple element 91 connected to the terminals 74—75 of the potentiometer system, whereby to impress between said terminals an electromotive force which shall be a measure of the temperature to which the thermocouple is exposed. The self-balancing potentiometer thus becomes operative to provide upon the scale 68 a measure of said temperature; and, so long as the solenoid valve 90 is maintained in an open condition, the regulator 84, actuated in response to changes in the translated position of the contact member 62, will correspondingly vary the air pressure applied to the operating element of the valve 83, thereby controlling the rate of admission of heating agent and regulating the temperature within the furnace. The control system as set forth is not claimed to possess patentable novelty, and is shown only as one form of such system to which the principles of the invention are applicable.

Connected across the output terminals of the amplifier 78 and in parallel with the winding 71 of the motor 63 is a full-wave rectifier 92 having its output terminals bridged by a capacitor 93 to by-pass any alternating current component which may exist in the output, and also connected to the actuating winding of the direct-current solenoid valve 89 to energize the same so long as an alternating-current input potential of any frequency is applied to the rectifier. Since, according to the principles set forth in said Bussey application, that component of the output of the transformer member 73 having a frequency other than that of the power source 72 remains present at all times the source 76 is operative, and without respect to balance or unbalance conditions in the potentiometer system, it follows that, so long as the oscillator and the transformer member and the amplifier are in normal operating condition and the circuit complete through the thermocouple 91, the solenoid valve 90 will remain energized and the pneumatic control system operative to regulate the temperature. If, however, any of these elements should fail, or if any other condition should develop whereby the output of the amplifier should drop to a zero value having no component of any frequency, the solenoid valve 90 will at once be deenergized, the fuel valve 83 closed, and a "safe" condition established throughout the system.

Figure 4:
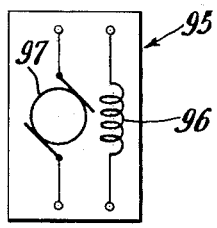
Fig. 4 is a diagrammatic view showing an alternative form of motor which may be employed in the practice of the invention.

In both self-balancing systems to which the application of the principles of the invention has been shown, the servomotor by which a condition of balance is restored has been indicated as of the induction class, in which torque is produced in a short-circuited rotor due to the interaction of fluxes developed in two electric windings mutually displaced about the circumference of said rotor, and supplied with alternating currents of a common frequency but having displacement in time-phase relationship. It will be understood, however, that the invention is applicable to use in conjunction with any type of motor whose operation is dependent upon a supply of alternating current at a specific frequency. In Fig. 4, for example, is shown diagrammatically a well-known type of motor which may be substituted for either of the induction motors 24 and 63, shown in Figs. 1 and 3 respectively. A conventional alternating-current commutating motor 95, provided with a field circuit 96 and an armature circuit 97, will operate when both said circuits are energized at a common frequency, in a direction dependent upon the phase relationship of the voltages impressed upon said respective circuits, and with an intensity dependent upon the product of said voltages. In substituting the motor 95 for the motor 24 of Fig. 1, the field circuit 96 would normally be directly energized from the source 21, and the armature circuit 97 connected across the output terminals of the amplifier 29 and suitable changes being made to establish proper phase relations between the voltages applied to said motor circuits, whereupon there will be obtained an operating performance substantially equivalent to that characterizing the induction motor 24. In a similar manner, the motor 95 could be substituted for the motor 63 in Fig. 3 by connecting the field circuit 96 to the source of supply 72, and the armature circuit 97 to the output terminals of the amplifier 78.

Figure 2:
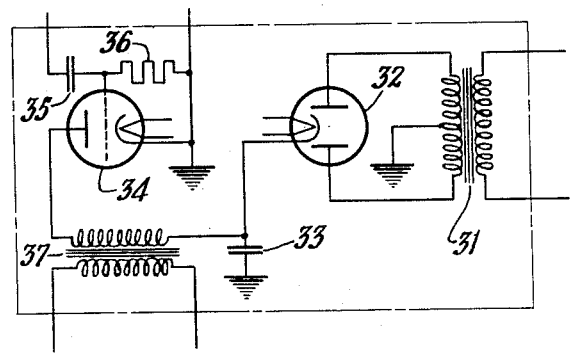
Fig. 2 is a simplified diagram of one form of amplifier suited to use in the system shown in Fig. 1.

While the invention as shown in Fig. 1 in conjunction with a self-balancing alternating-current bridge is applied to the actuation of signals, and as shown in Fig. 2 in conjunction with a direct-current potentiometer, to establishment of a "safe" condition in a control system, it will be obvious that these applications are not so restricted, and that the protective devices subject to actuation by the safety feature are not definitely related to the class of measurement performed by the servo-balanced network. Thus, the automatic control could as readily be associated with the alternating-current bridge, while the temperature sensitive direct-current potentiometer could be adapted to the operation of signal lights as shown in Fig. 1, or to actuation of any equivalent alarm device.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In combination, an alternating-current electric motor having two cooperating circuits whereby operation of said motor will be obtained only when said circuits are energized at a common frequency, means for continuously energizing one of said circuits at a predetermined frequency, an electrical transducer having input and output terminals, the latter terminals being connected to the other of said motor circuits, an adjustable network adapted to be energized at said predetermined frequency and connected to the input terminals of said transducer, whereby to apply to the other motor circuit a variable voltage of said frequency to effect correspondingly variable operation of said motor, means for impressing between said input terminals another voltage having a magnitude substantially independent of the adjusted condition of said network and of a frequency differing from said predetermined frequency and ineffective to coact with said voltages applied to said motor to operate the same, and means subject to the total output voltage of said transducer for operation to provide an indication of the presence or absence of such voltage.

2. In combination, an alternating-current electric motor having two cooperating circuits whereby operation of said motor will be obtained only when said circuits are energized at a common frequency, means for continuously energizing one of said circuits at a predetermined frequency, an electrical transducer having input and output terminals, the latter terminals being connected to the other of said motor circuits, an adjustable network adapted to be energized at said predetermined frequency and connected to the input terminals of said transducer, whereby to apply to the other motor circuit a variable voltage of said frequency to effect correspondingly variable operation of said motor, means for impressing between said input terminals another voltage having a magnitude substantially independent of the adjusted condition of said network and of a frequency differing from said predetermined frequency and ineffective to coact with said voltages applied to said motor to operate the same, and non-frequency-selective means subject to the total output voltage of said transducer for operation to provide an indication of the presence or absence of such voltage.

3. In combination, a two-phase electric motor, means for continuously energizing one of the phases thereof at a predetermined frequency, an electrical transducer having input and output terminals, the latter terminals being connected to the other of said phases, an adjustable network adapted to be energized at said frequency and connected to the input terminals of said transducer whereby to apply to said other phase a variable voltage of said frequency to effect correspondingly variable operation of said motor, means for impressing between said input terminals another voltage having a magnitude substantially independent of the adjusted condition of said network and of a frequency differing from said predetermined frequency and ineffective to coact with said voltages applied to said motor to operate the same, and means responsive to the total output voltage of said transducer for providing an indication of the presence or absence of said voltage.

4. In combination, an alternating-current electric motor having two cooperating circuits whereby operation of said motor will be obtained only when said circuits are energized at a common frequency, means for continuously energizing one of said circuits at a predetermined frequency, an electrical transducer having input and output terminals, the latter terminals being connected to the other of said motor circuits, an adjustable network adapted to be energized at said predetermined frequency and connected to the input terminals of said transducer, whereby to apply to the other motor circuit a variable voltage of said frequency to effect correspondingly variable operation of said motor, means for impressing between said input terminals another voltage having a magnitude substantially independent of the adjusted condition of said network and of a frequency differing from said predetermined frequency and ineffective to coact with said voltages applied to said motor to operate the same, a relay, means rendering said relay responsive to the presence or absence of output from said transducer irrespective of frequency, and signal means actuated by said relay.

5. In combination, an alternating-current electric motor having two cooperating circuits whereby operation of said motor will be obtained only when said circuits are energized at a common frequency, means for continuously energizing one of said circuits at a predetermined frequency, an electrical transducer having input and output terminals, the latter terminals being connected to the other of said motor circuits, an adjustable network adapted to be energized at said predetermined frequency and connected to the input terminals of said transducer, whereby to apply to the other motor circuit a variable voltage of said frequency to effect correspondingly variable operation of said motor, means for impressing between said input terminals another voltage having a magnitude substantially independent of the adjusted condition of said network and of a frequency differing from said predetermined frequency and ineffective to coact with said voltages applied to said motor to operate the same, a rectifier connected to the output terminals of said transducer to provide a unidirectional voltage of magnitude dependent upon the effective value of the output voltage of the transducer, and a direct-current-responsive device subject to actuation by said unidirectional voltage.

6. In combination, an alternating-current electric motor having two cooperating circuits whereby operation of said motor will be obtained when said circuits are energized at a common frequency, means for continuously energizing one of said circuits at a constant frequency, an amplifier having input and output terminals, the latter terminals being connected to the other of said motor circuits, balanceable electrical network adapted to be energized at said constant frequency and to deliver to the input terminals of said amplifier an alternating potential dependent in magnitude and phase position upon the unbalance condition of said network and reducing to a minimum when said network is balanced, whereby to operate said motor in a sense and with an intensity dependent upon said unbalance, means actuated by said motor to adjust the balance condition of said network, means for impressing upon the input terminals of said amplifier a substantially constant voltage differing in frequency from the energization of said motor circuits and ineffective to coact therewith in operating said motor, means connected to the output terminals of said amplifier and responsive only to the magnitude, regardless of frequency, of the voltage between said terminals, and means maintained in one condition by said voltage-responsive means when said voltage-responsive means is energized and reverting to another condition when said voltage-responsive means is de-energized, whereby to provide a definite response to failure of said amplifier or of said voltage-impressing means without respect to balance or unbalance conditions in said network.

7. In combination, an alternating-current electric motor having two cooperating circuits whereby operation of said motor will be obtained when said circuits are energized at a common frequency, means for continuously energizing one of said circuits at a constant frequency, an amplifier having input and output terminals, the latter terminals being connected to the other of said motor circuits, an electrical network adapted to be energized at said frequency and to deliver to the input terminals of said amplifier an alternating potential dependent in magnitude and phase position upon the departure of a measurable condition from a predetermined magnitude, and reducing to a minimum when said condition attains said magnitude, whereby to operate said motor in a sense and with an intensity dependent upon said departure, means actuated by said motor to apply an agent for regulating said condition, means for impressing upon the input terminals of said amplifier a voltage component differing in frequency from that of said source and ineffective to coact with said source frequency in operating said motor, non-selective relay means connected to the output terminals of said amplifier for energization without respect to the frequency of components in the output voltage, and to be de-energized only when the resultant of all components of said voltage attains a minimum value, and means subject to said relay means to superpose a controlling influence upon the admission of said agent upon de-energization of said relay means.

8. In combination, an electrical device adapted to operation only when subected to a voltage having a predetermined characteristic, an electrical transducer having input and output terminals, the latter terminals being connected to said device, a balanceable electrical network adapted to impress between said input terminals an electromotive force of predetermined frequency varying with the extent and direction of unbalance of said network whereby to provide at said output terminals a corresponding voltage suitable to variable operation of said device, means operated by said device for rebalancing said network, means for impressing between said input terminals a further electromotive force of different frequency whereby to provide in the output voltage of said transducer a component voltage unsuited to operation of said device and in magnitude substantially independent of changes in the balance condition of said network, means actuated by said device for regulating the supply of an agent affecting the value of a variable quantity, means responsive to variations in said value from a predetermined magnitude for correspondingly varying the direction and magnitude of unbalance of said network, and means connected to the output terminals of said transducer for actuating said regulating means to cut off the supply of said agent when insufficient voltage appears between said terminals and for automatically re-establishing said supply when sufficient voltage again appears between said terminals.

FREDERICK L. MALTBY.

REFERENCES CITED

The following references are of record in the file of this patent:

UNITED STATES PATENTS

| Number | Name | Date |
| --- | --- | --- |
| 2,077,179 | Moseley et al. | Apr. 13, 1937 |
| 2,332,432 | Busenkell | Oct. 19, 1943 |
| 2,340,126 | Jones | Jan. 25, 1944 |
| 2,376,527 | Wills | May 22, 1945 |
| 2,428,568 | Hill | Oct. 7, 1947 |
| 2,457,791 | Wild | Dec. 28, 1948 |
| 2,490,010 | Wild | Nov. 29, 1949 |